(12) United States Patent
Böhm et al.

(10) Patent No.: US 7,402,637 B2
(45) Date of Patent: Jul. 22, 2008

(54) METHOD FOR PRODUCING A POLY-1-OLEFIN IN THE PRESENCE OF A ZIEGLER CATALYST

(75) Inventors: Ludwig Böhm, Hattersheim (DE); Joachim Berthold, Kelkheim (DE)

(73) Assignee: Bassell Poliolefine GmbH, Wesseling (DE)

( * ) Notice: Subject to any disclaimer, the term of this patent is extended or adjusted under 35 U.S.C. 154(b) by 176 days.

(21) Appl. No.: 10/514,095

(22) PCT Filed: May 22, 2003

(86) PCT No.: PCT/EP03/05345

§ 371 (c)(1),
(2), (4) Date: Nov. 10, 2004

(87) PCT Pub. No.: WO03/099882

PCT Pub. Date: Dec. 4, 2003

(65) Prior Publication Data

US 2005/0239978 A1    Oct. 27, 2005

Related U.S. Application Data

(60) Provisional application No. 60/389,683, filed on Jun. 17, 2002.

(30) Foreign Application Priority Data

May 29, 2002   (DE) ................................ 102 23 798

(51) Int. Cl.
C08F 4/42      (2006.01)
C08F 110/00    (2006.01)

(52) U.S. Cl. ................ 526/124.2; 526/124.3; 526/352; 526/348; 502/103; 502/113; 502/115

(58) Field of Classification Search ................. 526/348, 526/352, 124.2, 124.3; 502/103, 113, 115
See application file for complete search history.

(56) References Cited

U.S. PATENT DOCUMENTS

| 3,644,318 A | 2/1972 | Diedrich et al. |
| 5,648,309 A | 7/1997 | Böhm |
| 7,008,898 B1 * | 3/2006 | Alt et al. ..................... 502/105 |

FOREIGN PATENT DOCUMENTS

| EP | 0 223 011 | 5/1987 |
| EP | 0 319 173 | 6/1989 |
| EP | 0 532 551 | 3/1993 |
| WO | WO-91/18934 | 12/1991 |
| WO | WO-01/38405 | 5/2001 |

OTHER PUBLICATIONS

Din 66 144:(5) pages, Mar. 1974 (In German).

* cited by examiner

*Primary Examiner*—Ling-Sui Choi
(74) *Attorney, Agent, or Firm*—Jarrod N Raphael

(57) ABSTRACT

The invention relates to a method for producing a poly-1-olefin by polymerization of a 1-olefin of the formula $R^4C=CH_2$, in which $R^4$ is hydrogen or an alkyl radical having from 1 to 10 carbon atoms, in suspension, in solution or in the gas the gas phase, at a temperature of from 20 to 200° C. and a pressure of from 0.5 to 50 bar, in the presence of a catalyst which consists of the product of the reaction of a magnesium alkoxide with a transition-metal compound (component a) and an organometallic compound (component b), whose component (a) has been produced by reacting a transitionmetal compound of titanium, zirconium, vanadium or chromium with a gelatinous dispersion of the magnesium alkoxide in an inert hydrocarbon. In accordance with the invention, the gelatinous dispersion is obtained by stirring, using a stirring element, or shearing, using a high-performance shearing tool, a suspension of a magnesium alkoxide powder having a mean particle size, expressed as the $d_{50}$ value, in the range from 50 to 1000 um, in an aliphatic hydrocarbon in which the magnesium alkoxide particles are insoluble. The suspension has, before conversion into the dispersion, been subjected to heat treatment at a temperature in the range from 40 to 150° C. over a period of from 10 to 100 hours.

21 Claims, No Drawings

METHOD FOR PRODUCING A POLY-1-OLEFIN IN THE PRESENCE OF A ZIEGLER CATALYST

RELATED APPLICATIONS

This application is a national stage application (under 35 U.S.C. 371) of PCT/EP03/05345 filed May 22, 2003 which claims benefit to German application serial no. 102 23 798.0 filed May 29, 2002 and U.S. provisional application Ser. No. 60/389,683 filed Jun. 17, 2002.

The invention relates to a method for producing a poly-1-olefin in the presence of a Ziegler catalyst produced from a gelatinous magnesium alkoxide dispersion.

Reaction of magnesium alkoxides $Mg(OR^1)(OR^2)$ or "complex" magnesium alkoxides with compounds of titanium, zirconium, vanadium or chromium enable the production of solids which, together with organometallic compounds from group 1, 2 or 13 of the Periodic Table (the groups are cited as printed, for example, in Handbook of Chemistry and Physics, 76th Edition (1995-1996)), give excellent catalysts for the polymerization of olefins.

A method is known for polymerizing 1-olefins in the presence of a mixed catalyst whose component (a) has been produced by reaction of magnesium alkoxides with tetravalent, halogen-containing titanium compounds (cf. U.S. Pat. No. 3,644,318). The magnesium alkoxides are employed in the same form as they are commercially available. The polymers obtainable in this method have a relatively narrow molecular weight distribution.

Further known is a method for producing a Ziegler catalyst in which a dissolved magnesium alkoxide is reacted with a halogen-containing Ti or V compound and a transition-metal alkoxide (cf. EP-A 0 319 173). The catalyst particles formed in the method are spherical and have a mean particle size of from 10 to 70 μm.

Finally, it is also known for the transition-metal component used to be a product of the reaction of a tetravalent, halogen-containing titanium compound with a magnesium alkoxide which contains at least 40% by weight of particles having a diameter of less than 63 μm (cf. EP-A 0 223 011). A magnesium alkoxide having this particle size is obtained, inter alia, by grinding a commercial product in a ball mill. The magnesium alkoxide is employed as a suspension in an inert hydrocarbon.

It has also been described in EP-A 0 532 551 that Ziegler catalysts having high to very high activity and with the possibility of controlling the particle size distribution of the polymer are obtained, if the magnesium alkoxide is employed in the form of a gelatinous dispersion. This gelatinous dispersion is obtained by suspending the commercially available magnesium alkoxide in an inert hydrocarbon and dispersing this suspension under a protective gas (Ar or $N_2$) in a dispersion unit having a high-performance shearing tool (for example ®Ultra-Turrax or ®Dispax, IKA-Maschinenbau Janke & Kunkel GmbH, ®Supraton, Krupp-Buckau, Germany) over a period of several hours or days with strong cooling.

Nevertheless, the known catalysts are still unsatisfactory inasmuch as small proportions of coarse particles still occur in the catalyst and consequently in the polymer powder. These result in inhomogeneities in the product, which are known as fisheyes, and should be reduced by suitable measures.

The object of the present invention was therefore to find a method for producing polyolefins in the presence of a Ziegler catalyst whose first component is the product of the reaction of a gelatinous magnesium alkoxide dispersion with a transition-metal compound, where the magnesium alkoxide dispersion is to be produced in such a way that the polyolefin produced using the catalyst has a significantly smaller amount of coarse fractions than in accordance with the prior art.

This object is achieved by a method for producing a poly-1-olefin by polymerization of a 1-olefin of the formula $R^4CH=CH_2$, in which $R^4$ is hydrogen or an alkyl radical having from 1 to 10 carbon atoms, in suspension, in solution or in the gas phase, at a temperature of from 20 to 200° C. and a pressure of from 0.5 to 50 bar, in the presence of a catalyst consisting of the product of the reaction of a magnesium alkoxide with a transition-metal compound (component a) and an organometallic compound (component b), whose component (a) has been produced by reacting a transition-metal compound of titanium, zirconium, vanadium or chromium with a gelatinous dispersion of the magnesium alkoxide in an inert hydrocarbon, whose characterizing feature is to be regarded as that the gelatinous dispersion of the magnesium alkoxide is obtained by stirring, using a stirring element, or shearing, using a high-performance shearing tool, a suspension of magnesium alkoxide powder having a mean particle size, expressed as the $d_{50}$ value, in the range from 50 to 1000 μm, preferably from 200 to 600 μm, in an inert hydrocarbon in which the magnesium alkoxide is insoluble, and that the suspension of magnesium alkoxide powder has, before conversion into the dispersion, been subjected to heat treatment at a temperature in the range from 40 to 150° C., preferably from 60 to 120° C., over a time period of from 10 to 100 hours.

The gelatinous magnesium alkoxide dispersion produced in accordance with the invention by stirring, using a stirring element, or shearing, using a high-performance shearing tool, a suspension of the ground magnesium alkoxide powder in an inert hydrocarbon in which the magnesium alkoxide is insoluble exhibits slower settling of the solid fraction and a higher space proportion of the solid fraction in the dispersion after complete settling of the solid fraction, expressed as the volume percent, than the suspension of the ground magnesium alkoxide powder employed in the same inert hydrocarbon with the same ratio of initially introduced solid fraction to hydrocarbon fraction, expressed as the weight percent and at the same temperature.

A gelatinous dispersion of the type according to the invention is produced by stirring, using a stirring element, or shearing, using a high-performance shearing tool, a suspension of the ground magnesium alkoxide powder in an inert hydrocarbon in which the magnesium alkoxide is insoluble, in an inertized vessel, with the same average number of particles being present in each volume increment of the mixture. The stirring using a stirring element or shearing using a high-performance shearing tool is preferably carried out in accordance with the invention at a temperature in the range from 10 to 150° C., preferably from 20 to 100° C., over a period of from 1 to 24 hours, preferably from 2 to 20 hours, in an inert hydrocarbon in which the ground magnesium alkoxide particles are insoluble.

The invention furthermore relates to the catalyst employed in this method.

Component (a) is produced using a commercially available magnesium alkoxide. This magnesium alkoxide can be a "simple" magnesium alkoxide of the formula $Mg(OR^1)(OR^2)$, in which $R^1$ and $R^2$ are identical or different and are an alkyl radical having from 1 to 6 carbon atoms. Examples are $Mg(OCH_3)_2$, $Mg(OC_2H_5)_2$, $Mg(OiC_3H_7)_2$, $Mg(OnC_4H_9)_2$, $Mg(OCH_3)(OC_2H_5)$ and $Mg(OC_2H_5)(OnC_3H_7)$. It is also possible to use a "simple" magnesium alkoxide of the formula Mg(OR)$_n$X$_m$, in which X=halogen, (SO$_4$)$_{1/2}$, OH, (CO$_3$)$_{1/2}$, (PO$_4$)$_{1/3}$ or Cl, R has the above-mentioned meaning of R$^1$ or R$^2$, and n+m=2.

However, it is also possible to employ a "complex" magnesium alkoxide. The term "complex" magnesium alkoxide denotes a magnesium alkoxide which, besides magnesium, contains at least one metal from group 1, 2, 13 or 14 of the Periodic Table. Examples of a complex magnesium alkoxide of this type are: [Mg(OiC$_3$H$_7$)$_4$]Li$_2$; [Al$_2$(OiC$_3$H$_7$)$_8$]Mg; [Si(OC$_2$H$_5$)$_6$]Mg; [Mg(OC$_2$H$_5$)$_3$]Na; [Al$_2$(OiC$_4$H$_9$)$_8$]Mg; [Al$_2$(O-secC$_4$H$_9$)$_6$(OC$_2$H$_5$)$_2$]Mg.

The complex magnesium alkoxides (alkoxo salts) are produced by known methods.

Preference is given to the use of the simple magnesium alkoxides, in particular Mg(OC$_2$H$_5$)$_2$, Mg(OnC$_3$H$_7$)$_2$ or Mg(OiC$_3$H$_7$)$_2$. The magnesium alkoxide is employed in pure form.

Commercially available Mg(OC$_2$H$_5$)$_2$ generally has the following specification:

| | |
|---|---|
| Mg content | 21-22% by weight |
| MgCO$_3$ | ≦1% by weight |
| C$_2$H$_5$OH content | <0.3% by weight |

The mean particle diameter is 400 μm, with at least 90% of the particles having a particle diameter in the range from 200 to 1200 μm.

The commercially available magnesium alkoxide having a mean particle diameter of about 400 μm is, in accordance with the invention, suspended in an organic suspension medium, preferably an inert hydrocarbon, in an inertized container and then subjected to heat treatment. The heat treatment can particularly preferably be carried out at a temperature of from 80 to 110° C. and over a time period of from 20 to 75 hours, it being favourable for the suspension to be kept in motion during the heat treatment by means of a stirrer.

For the purposes of the invention, a container is regarded as inertized if the proportion of gases from the atmospheric environment in the entire interior space of the container which comes into contact with the magnesium alkoxide during the suspension and subsequent heat treatment has been reduced to less than 1% by volume by displacement with inert gases. For the purposes of the present invention, inert gases are regarded as being, in particular, nitrogen and argon.

Suitable inert hydrocarbons in accordance with the invention are aliphatic or cycloaliphatic hydrocarbons, such as butane, pentane, hexane, heptane, isooctane, cyclohexane and methylcyclohexane, and aromatic hydrocarbons, such as toluene and xylene; hydrogenated diesel oil or gasoline fractions which have been carefully freed from oxygen, sulphur compounds and moisture can also be used.

For the production of component (a) of the Ziegler catalyst, the gelatinous dispersion is then reacted in one step or in a plurality of steps with a Ti compound (TiCl$_4$, Ti(OR)$_4$, inter alia), a Zr compound (Zr(OR)$_4$, ZrCl$_2$(OCOC$_6$H$_5$)$_2$, inter alia), a V compound (VCl$_4$, VOCl$_3$, inter alia) or a chromium compound (CrO$_2$Cl$_2$, inter alia).

The gelatinous magnesium alkoxide dispersion is reacted here with the transition-metal compound at a temperature in the range from 20 to 100° C., preferably from 60 to 90° C., in the presence of an inert hydrocarbon with stirring at a stirrer speed corresponding to requirements. From 0.05 to 5 mol of transition-metal compound, preferably from 0.1 to 3.5 mol, are employed per mole of magnesium alkoxide. The reaction duration is from 0.5 to 8 hours, preferably from 2 to 6 hours.

A magnesium- and transition metal-containing solid which is insoluble in hydrocarbon and which is referred to for the purposes of the invention as component (a) is obtained. Component (a) forms a suspension (solid/liquid) with the inert hydrocarbon.

The polymerization catalyst to be used in accordance with the invention is produced by combining component (a) and an organometallic compound of a metal from group 1, 2 or 13 of the Periodic Table (component b). Component (a) as a suspension can be reacted directly with component (b).

Component (b) used is preferably an organoaluminium compound. Suitable organoaluminium compounds are chlorine-containing organoaluminium compounds, the dialkylaluminium monochlorides of the formula R$^3_2$AlCl or alkylaluminium sesquichlorides of the formula R$^3_3$Al$_2$Cl$_3$, in which R$^3$ is an alkyl radical having from 1 to 16 carbon atoms. Examples which may be mentioned are (C$_2$H$_5$)$_2$AlCl, (iC$_4$H$_9$)$_2$AlCl and (C$_2$H$_5$)$_3$Al$_2$Cl$_3$. It is also possible to employ mixtures of these compounds.

The product of the reaction of component (a) and component (b) is then converted into an active system with an organoaluminium compound as so-called cocatalyst. Suitable for this purpose are chlorine-free organoaluminium compounds, such as trialkylaluminium AlR$^3_3$ or dialkylaluminium hydrides of the formula AlR$^3_2$H, in which R$^3$ is an alkyl radical having from 1 to 16 carbon atoms. Examples are Al(C$_2$H$_5$)$_3$, Al(C$_2$H$_5$)$_2$H, Al(C$_3$H$_7$)$_3$, Al(C$_3$H$_7$)$_2$H, Al(iC$_4$H$_9$)$_3$, Al(iC$_4$H$_9$)$_2$H, Al(C$_8$H$_{17}$)$_3$, Al(C$_{12}$H$_{25}$)$_3$, Al(C$_2$H$_5$)(C$_{12}$H$_{25}$)$_2$ and Al(iC$_4$H$_9$)(C$_{12}$H$_{25}$)$_2$.

The cocatalyst employed can also be mixtures of organometallic compounds of metals from group 1, 2 or 13 of the Periodic Table, in particular mixtures of different organoaluminium compounds.

The following mixtures may be mentioned by way of example: Al(C$_2$H$_5$)$_3$ and Al(iC$_4$H$_9$)$_3$, Al(C$_2$H$_5$)$_2$Cl and Al(C$_8$H$_{17}$)$_3$, Al(C$_2$H$_5$)$_3$ and Al(C$_8$H$_{17}$)$_3$, Al(C$_4$H$_9$)$_2$H and Al(C$_8$H$_{17}$)$_3$, Al(iC$_4$H$_9$)$_3$ and Al(C$_8$H$_{17}$)$_3$, Al(C$_2$H$_5$)$_3$ and Al(C$_{12}$H$_{25}$)$_3$, Al(iC$_4$H$_9$)$_3$ and Al(C$_{12}$H$_{25}$)$_3$, Al(C$_2$H$_5$)$_3$ and Al(C$_{16}$H$_{33}$)$_3$, Al(C$_3$H$_7$)$_3$ and Al(C$_{18}$H$_{37}$)$_2$(iC$_4$H$_9$), Al(C$_2$H$_5$)$_3$ and isoprenylaluminium (=product of the reaction of isoprene with Al(iC$_4$H$_9$)$_3$ or Al(iC$_4$H$_9$)$_2$H).

Catalyst and cocatalyst can be mixed before the polymerization in a stirred-tank reactor at a temperature in the range from −30 to 150° C., preferably from −10 to +120° C. However, it is also possible to combine catalyst and cocatalyst directly in the polymerization reactor at a temperature in the range from 20 to 200° C. However, the addition of the cocatalyst can also be carried out in two steps by pre-activating the catalyst comprising component (a) and component (b) with a first portion of the cocatalyst at a temperature in the range from −30 to 150° C. before the polymerization reaction and carrying out the further addition of a further portion of the same or another cocatalyst in the polymerization reactor at a temperature in the range from 20 to 200° C.

The polymerization catalyst (Ziegler catalyst) to be used in accordance with the invention is employed for the polymerization of 1-olefins of the formula R$^4$—CH=CH$_2$ in which R$^4$ is a hydrogen atom or an alkyl radical having from 1 to 10 carbon atoms, for example ethylene, propylene, 1-butene, 1-hexene, 4-methyl-1-pentene or 1-octene.

Ethylene is preferably polymerized alone or in a mixture of at least 50% by weight of ethylene and a maximum of 50% by weight of another 1-olefin of the above formula. In particular, ethylene alone or a mixture of at least 90% by weight of ethylene and a maximum of 10% by weight of another 1-olefin of the above formula is polymerized.

The polymerization is carried out in a known manner in solution, in suspension or in the gas phase, continuously or discontinuously, in one or more steps, at a temperature of from 20 to 200° C., preferably from 50 to 150° C. The pressure is from 0.5 to 50 bar. The polymerization is preferably carried out in the pressure range from 1.5 to 30 bar which is of particular interest in industry.

Component (a) or the product of the reaction of component (a) with component (b) is used here in a concentration, based on the transition metal, of from 0.0001 to 1 mmol, preferably from 0.001 to 0.5 mmol, of transition metal per dm³ of dispersion medium. In principle, however, higher concentrations are also possible.

The suspension polymerization is carried out in an inert dispersion medium which is customary for the Ziegler low-pressure process, for example in an aliphatic or cycloaliphatic hydrocarbon; examples thereof which may be mentioned are, for example, butane, pentane, hexane, heptane, isooctane, cyclohexane and methylcyclohexane. It is furthermore possible to use gasoline or hydrogenated diesel oil fractions which have been carefully freed from oxygen, sulphur compounds and moisture.

The suspension polymerization, like the gas-phase polymerization, can be carried out directly or after prepolymerization of the catalyst, with the prepolymerization advantageously being carried out by the suspension method.

The molecular weight of the polymer is regulated in a known manner, preferably using hydrogen for this purpose.

As a consequence of the high activity of the catalyst used, the method according to the invention gives polymers having a very low transition-metal and halogen content and therefore extremely good values in the colour stability and corrosion test.

Furthermore, the method according to the invention enables the production of the catalysts in such a way that their particle size distribution and also the particle shape of the polymer powder formed and surprisingly also the hydrogen sensitivity of the catalyst can be set to the optimum, so that small proportions of coarse particles and thus improved homogeneity in the polymer are achieved due to small amounts of extremely undesired fisheyes.

In accordance with the invention, an improved particle morphology, in particular a surprisingly narrow particle size distribution, expressed as the S value in accordance with DIN 66 144, no coarse and fine fractions and high catalyst productivities are obtained. The bulk densities are comparable with those in accordance with the prior art.

Thus, on use of the gelatinous magnesium alkoxide dispersions produced in accordance with the invention by prior heat treatment and subsequent vigorous stirring, using a stirring element, or shearing, using a high-performance shearing tool, a suspension of the ground magnesium alkoxide in an inert hydrocarbon in which the magnesium alkoxide particles are insoluble, the morphological properties of the polymer powder can be influenced directly. This means valuable advantages for an industrial process, in addition to which it should in particular be emphasized that transport of the polymer powder in the plant is simpler, the flowability of the polymer powder is better, impurities due to coarse fractions (fisheyes) are reduced, drying requires less energy and the extruder can be operated at higher throughputs. The high catalyst productivity gives rise to lower catalyst residue contents in the product.

In the context of the working examples described below, by means of which the invention is intended to be explained still more clearly to the person skilled in the art, the Mg:Ti:Cl ratios for characterization of the catalysts were determined by conventional analytical methods. The powder particle sizes and particle size distributions were determined by screen analysis in accordance with DIN 66 144.

EXAMPLE 1

According to the Invention

Production of catalyst component (a) using a gelatinous $Mg(OC_2H_5)_2$ dispersion obtained by stirring a pre-heat-treated suspension of $Mg(OC_2H_5)_2$ in an inert hydrocarbon.

A suspension of 57 g of a commercially available $Mg(OC_2H_5)_2$ in 1.0 dm³ of diesel oil having a boiling range of from 140 to 170° C. (hydrogenated gasoline fraction) in a 2 dm³ stirred vessel with reflux condenser, two-blade stirrer and inert-gas blanket (Ar) was warmed to a temperature of 100° C. and stirred over a period of 48 hours at a stirrer speed of 50 rpm (revolutions per minute). Stirring was then continued at room temperature for a further 20 hours period at a stirrer speed of 300 ppm.

The settling time of the gelatinous $Mg(OC_2H_5)_2$ dispersion obtained thereby at room temperature was about 30 minutes after the stirrer had been switched off.

This $Mg(OC_2H_5)_2$ dispersion was heated to 85° C. at a stirrer speed of 150 rpm, and 0.15 mol of concentrated $TiCl_4$ was metered in over the course of 4 hours. The resultant suspension of component (a) was then heated at 110° C. for 1 hour. 0.35 mol of $Al_2(C_2H_5)_3Cl_3$ in 200 cm³ of diesel oil (hydrogenated gasoline fraction having a boiling range of from 140 to 170° C.) as component (b) was metered in over the course of 2 hours at a stirrer speed of 250 rpm. The temperature was then held at 110° C. for a further 2 hours.

The production of the catalyst from component (a) and component (b) was thus complete. The solid suspension was cooled to room temperature. The molar ratio was: Mg:Ti:Cl≈1:0.3:2.4.

EXAMPLE 2

According to the Invention

The production of catalyst component (a) using a gelatinous $Mg(OC_2H_5)_2$ dispersion obtained by stirring a suspension of $Mg(OC_2H_5)_2$ in an inert hydrocarbon was carried out by the method as described in Example 1, with the difference that the commercially available $Mg(OC_2H_5)_2$, which had been heat-treated at a temperature of 95° C. over a period of 50 hours, in diesel oil having a boiling range of from 140 to 170° C. (hydrogenated gasoline fraction) was stirred at a temperature of 85° C. for 20 hours at a stirrer speed of 400 rpm.

The settling time of the gelatinous $Mg(OC_2H_5)_2$ dispersion obtained thereby at room temperature was about 60 minutes after the stirrer had been switched off.

The addition of component (b) was carried out as in Example 1. The molar ratio of the catalyst produced in this way was: Mg:Ti:Cl≈1:0.3:2.3.

COMPARATIVE EXAMPLE 1

Production of catalyst component (a) using a suspension of $Mg(OC_2H_5)_2$ in an inert hydrocarbon without prior heat treatment.

57 g of a commercially available $Mg(OC_2H_5)_2$ in 1.0 dm³ of diesel oil having a boiling range of from 140 to 170° C. (hydrogenated gasoline fraction) were stirred at room temperature for 10 minutes in a 2 dm³ stirred vessel with reflux condenser, two-blade stirrer and inert-gas blanket (Ar) at a stirrer speed of 100 rpm.

The settling time of the suspension at room temperature was about 10 minutes after the stirrer had been switched off.

This suspension was heated to 85° C. at a stirrer speed of 150 rpm, and 0.15 mol of concentrated $TiCl_4$ was metered in over the course of 4 hours. The resultant suspension of component (a) was then heated at 110° C. for 1 hour. 0.35 mol of $Al_2(C_2H_5)_3Cl_3$ in 200 cm³ of diesel oil (hydrogenated gasoline fraction having a boiling range of from 140 to 170° C.) as component (b) was metered in over the course of 2 hours at a stirrer speed of 250 rpm. The temperature was then held at 110° C. for a further 2 hours period.

The production of the catalyst from component (a) and component (b) was thus complete.

The solid suspension was cooled to room temperature. The molar ratio was: Mg:Ti:Cl≈1:0.3:2.5.

COMPARATIVE EXAMPLE 2

Production of catalyst component (a) using a gelatinous $Mg(OC_2H_5)_2$ dispersion obtained by dispersion of a suspension of commercially available $Mg(OC_2H_5)_2$ in an inert hydrocarbon using a high-performance shearing tool.

137 g of commercially available $Mg(OC_2H_5)_2$ were suspended in diesel oil (hydrogenated gasoline fraction having a boiling range of from 140 to 170° C.) (total volume 1.0 dm³). The suspension was converted into a dispersion in a cylindrical glass vessel under an inert gas (Ar) in order to exclude moisture and air ($O_2$), using a high-speed disperser (®Ultra-Turrax) with external cooling using an ice bath (duration about 8 hours). The dispersion had a gelatinous consistency.

0.42 dm³ (containing 57 g of $Mg(OC_2H_5)_2$) of the gelatinous dispersion was transferred into a 2 dm³ stirred vessel with reflux condenser, two-blade stirrer and inert-gas blanket (Ar), mixed with 0.58 dm³ of diesel oil having a boiling range of from 140 to 170° C. (hydrogenated gasoline fraction) and stirred at room temperature for 10 minutes at a stirrer speed of 100 rpm.

The settling time of the gelatinous dispersion at room temperature was about 60 minutes after the stirrer had been switched off.

This gelatinous dispersion was heated to 85° C. at a stirrer speed of 150 rpm, and 0.15 mol of concentrated $TiCl_4$ was metered in over the course of 4 hours. The resultant suspension of component (a) was then heated at 110° C. for 1 hour. 0.35 mol of $Al_2(C_2H_5)_3Cl_3$ in 200 cm³ of diesel oil (hydrogenated gasoline fraction having a boiling range of from 140 to 170° C.) as component (b) was metered in over the course of 2 hours at a stirrer speed of 250 rpm. The temperature was then held at 110° C. for a further 2 hours.

The production of the catalyst from component (a) and component (b) was thus complete.

The solid suspension was cooled to room temperature. The molar ratio was: Mg:Ti:Cl≈1:0.3:2.5.

EXAMPLE 3

Polymerization experiments with the catalysts from Examples 1 and 2 and the two comparative examples.

The polymerization experiments were carried out discontinuously in a 200 dm³ reactor. This reactor was fitted with an impeller stirrer and baffles. The temperature in the reactor was measured and automatically kept constant. The polymerization temperature was 85±1 K.

The polymerization reaction was carried out in the following manner:

100 dm³ of diesel oil were introduced into the reactor under an $N_2$ blanket and heated to 85° C. The cocatalyst ($Al(C_2H_5)_3$) was added under an inert-gas blanket ($N_2$) so that a cocatalyst concentration of 0.50 mmol/dm³ was present in the reactor. The catalyst, produced from component (a) and component (b), in an amount which corresponds to 2.0 mmol of titanium was then introduced into the reactor as a suspension diluted with diesel oil.

The reactor was charged up to 8 bar with $H_2$ (hydrogen) and decompressed again, and this operation was repeated a number of times in order to remove the nitrogen completely from the reactor (the process was monitored by measuring the $H_2$ concentration in the gas space of the reactor, which finally indicated 95% by volume). The polymerization was initiated by opening the ethylene inlet. Throughout the polymerization time, ethylene was supplied in an amount of 8.0 kg/h, with the pressure in the reactor slowly increasing. The content of hydrogen in the gas space of the reactor was measured constantly, and the proportion by volume kept constant by metering in hydrogen correspondingly (% by volume of $H_2$=40).

The polymerization was terminated after 225 minutes (30 kg of ethylene gas input) and the total pressure read off. The reactor contents were discharged onto a filter. The polymer to which diesel oil was adhering was dried in a stream of nitrogen for a number of hours. The results of the polymerization are summarized below in Table 1.

TABLE 1

Polymerization experiments 200 dm³ reactor,
50 mmol of triethylaluminium, 2.0 mmol of Ti (catalyst),
100 dm³ of diesel oil, 8.0 kg/h of ethylene,
polymerization temperature 85° C., polymerization duration 225 minutes,
40% by volume of hydrogen in the gas space

| Polymerization experiments Catalyst component (a) from | Ex. 1 | Ex. 2 | Comp. Ex. 1 | Comp. Ex. 2 | Measurement methods |
|---|---|---|---|---|---|
| Final pressure [bar] | 5.156 | 5.376 | 6.426 | 4.528 | |
| PE yield [kg] | 29.7 | 29.9 | 30.0 | 30.0 | |
| MFR 190/5 [dg/min] | 6.53 | 5.77 | 6.98 | 8.56 | ISO 1133 |
| Bulk density [g/l] | 344 | 330 | 345 | 325 | |
| $d_{50}$ [µm] | 344 | 299 | 310 | 300 | |
| S value {ln($d_{50}/d_{16}$)} | 0.24 | 0.34 | 0.39 | 0.39 | DIN 66 144 |
| Proportion of coarse particles >400 µm [% by wt.] | 0.5 | 0.7 | 4.5 | 5.1 | Sieve analysis DIN 66 144 |

It is clear from the values in the table that the particle size distribution of the polymer, expressed as its S value in accordance with DIN 66 144, is advantageously narrower in the method according to the invention than in comparison with the comparative examples. This means a reduction in the fines content in the polymer powder, which has the technical advantage that fine dust is no longer discharged, the drying time is shortened and better conveying behaviour of the powder results in higher input into the extruder. Furthermore, it is clear that the coarse particle contents drop significantly in the examples with heat treatment of the suspension of magnesium alkoxide.

The invention claimed is:

1. A method for producing a poly-1-olefin, comprising
   (A) subjecting a suspension of magnesium alkoxide powder having a mean particle size, expressed as the $d_{50}$ value, in the range from 50 to 100 µm to heat treatment at a temperature in the range from 40 to 150° C. over a time period of from 10 to 100 hours;

(B) vigorously stirring, using a stirring element, or shearing, using a high-performance shearing tool, the suspension of a magnesium alkoxide powder in an inert hydrocarbon in which the magnesium alkoxide powder are insoluble to obtain a gelatinous dispersion of the magnesium alkoxide;

(C) reacting the gelatinuous dispersion of the magnesium alkoxide with a transition-metal compound of titanium, zirconium, vanadium or chromium in an inert hydrocarbon to produce a component (a);

(D) forming a catalyst which consists of the product of the reaction of the magnesium alkoxide with the transition-metal compound and an organometallic compound; and (E) polymerization of a 1-olefin of the formula $R^4CH=CH_2$, in which $R^4$ is hydrogen or an alkyl radical having from 1 to 10 carbon atoms, in suspension, in solution or in the gas phase, at a temperature in the range from 20 to 200° C. and a pressure in the range from 0.5 to 50 bar, in the presence of the catalyst.

2. The method according to claim 1, wherein the stirring, using a stirring element, or shearing, using a high-performance shearing tool, of the magnesium alkoxide powder, is carried out in an inert hydrocarbon at a temperature in the range from 10 to 150° C. and over a timer period in the range from 1 to 24 hours.

3. The method according to claim 1, wherein the inert hydrocarbon employed is an aliphatic or cycloaliphatic hydrocarbon, an aromatic hydrocarbon, hydrogenated diesel oil or gasoline fractions which have been carefully freed from oxygen, sulphur compounds and moisture.

4. The method according to claim 1, wherein the gelatinous dispersion of magnesium alkoxide is reacted in one step or in a plurality of steps with a transition-metal compound.

5. The method according to claim 1, wherein the magnesium alkoxide is reacted with the transition-metal compound at a temperature of from 20 to 100° C., in the presence of an inert hydrocarbon with stirring, where from 0.05 to 5 mol of transition-metal compound are employed per mole of magnesium alkoxide.

6. The method according to claim 5, wherein the duration of the reaction is from 0.5 to 8 hours.

7. The method according to claim 1, wherein the product of the reaction of magnesium alkoxide and transition-metal compound is subsequently reacted with chlorine-containing organoaluminium compounds to give the catalyst.

8. The method according to claim 1, wherein the catalyst produced by reacting component (a) and component (b) is combined, before the polymerisation, with a cocatalyst in a stirred-tank reactor at a temperature in the range from −30 to 150° C. or directly in the polymerization reactor at a temperature in the range from 20 to 200° C., or in that the addition of the cocatalyst is carried out in two steps, with the catalyst being pre-activated with a first portion of cocatalyst at a temperature in the range from −30 to 150° C. before the polymerization reaction, and the further addition of a further portion of the same or another cocatalyst being carried out in the polymerization reactor at a temperature of from 20 to 200° C.

9. The method according to claim 1, wherein the catalyst is added in the pre-polymerized state to the polymerization reaction.

10. The method according to claim 1, wherein the catalyst is employed for the polymerization of 1-olefins of the formula $R^4$—$CH=CH_2$, in which $R^4$ is a hydrogen atom or an alkyl radical having from 1 to 10 carbon atoms, with ethylene being polymerized alone or in a mixture of at least 50% by weight of ethylene and a maximum of 50% by weight of another 1-olefin of the above formula, and in that the molecular weight of the polymer is regulated by means of hydrogen.

11. The method according to claim 1, wherein the polymerization is carried out in solution, in suspension or in the gas phase, continuously or discontinuously, in one or more steps, at a temperature in the range from 20 to 200° C. and in that the pressure is from 0.5 to 50 bar.

12. The method according to claim 1, wherein component (a) or the product of the reaction of component (a) with component (b) is employed in a concentration, based on the transition metal, of from 0.0001 to 1 mmol of transition metal per $dm^3$ of dispersion medium, and in that the polymerization is carried out in an inert dispersion medium selected from the group consisting of aliphatic or cycloaliphatic hydrocarbons, or gasoline or hydrogenated diesel oil fractions which have been carefully freed from oxygen, sulphur compounds and moisture.

13. The method according to claim 2, wherein said heat treatment is at the temperature in the range from 60 to 120° C.

14. The method according to claim 13, wherein said inert hydrocarbon employed is butane, pentane, hexane, heptane, isooctane, cyclohexane, methylchyclohexane, toluene or xylene.

15. The method according to claim 14, wherein said transition-metal compound is a Ti compound, a zirconium compound, a V compound or a Cr compound.

16. The method according to claim 14, wherein said transition-metal compound is $TiCl_4$ or $Ti(OR)_4$, $ZrCl_4$, $Zr(OR)_4$, $ZrCl_2(OCOC_6H_5)_2$, $VCl_4$, $VOCl_3$, or $CrO_2Cl_2$.

17. The method according to claim 16, wherein the magnesium alkoxide is reacted with the transition-metal compound at a temperature of from 60 to 90° C., in the presence of said inert hydrocarbon with stirring, where from 0.1 to 3.5 mol of transition-metal compound are employed per mole of magnesium alkoxide.

18. The method according to claim 17, wherein the duration of the reaction is from 2 to 6 hours and the product of the reaction of magnesium alkoxide and transition-metal compound is subsequently reacted with said chlorine-containing organoaluminium compounds which are dialkylaluminium monochlorides of the formula $R^3{}_2AlCl$ or alkylaluminium sesquichlorides of the formula $R^3{}_3Al_2Cl{}_3$, in which $R^3$ is an alkyl radical having from 1 to 16 carbon atoms to give the catalyst.

19. The method according to claim 18, wherein said chlorine-containing organoaluminium compounds are $(C_2H_5)_2AlCl$, $(iC_4H_9)_2AlCl$ or $(C_2H_5)_3Al_2Cl_3$, or with mixtures of these compounds and the catalyst produced by reacting component (a) and component (b) is combined, before the polymerisation, with a cocatalyst in a stirred-tank reactor at a temperature in the range from −10 to 120° C. or directly in the polymerization reactor at a temperature in the range from 20 to 200° C., or in that the addition of the cocatalyst is carried out in two steps, with the catalyst being pre-activated with a first portion of cocatalyst at a temperature in the range from −30 to 150° C. before the polymerization reaction, and the further addition of a further portion of the same or another cocatalyst being carried out in the polymerization reactor at a temperature of from 20 to 200° C.

20. The method according to claim 19, wherein the catalyst is employed for the polymerization of 1-olefins of the formula $R^4$—$CH=CH_2$, in which $R^4$ is a hydrogen atom or ethylene, propylene, 1-butene, 1-hexene, 4-methyl-1-pentene or 1-octene, with ethylene being polymerized alone or in a mixture of at least 50% b weight of ethylene and a maximum of 50% by weight of another 1-olefin of the above formula, and in that the molecular weight of the polymer is regulated by means of hydrogen and said polymerization is carried out in solution, in suspension or in the gas phase, continuously or discontinuously, in one or more steps, at a temperature in the range from to 50 to 150° C. and in that the pressure is from 1.5 to 30 bar.

21. The method according to claim 20, wherein the component (a) or the product of the reaction of component (a) with component (b) is employed in a concentration, based on the transition metal, of from 0.001 to 0.5 mmol, of transition metal per $dm^3$ of dispersion medium, and in that the polymerization is carried out in an inert dispersion medium selected from the group consisting of butane, pentane, hexane, heptane, isooctane, cyclohexane, methylcyclohexane, gasoline and hydrogenated diesel oil fractions which have been carefully freed from oxygen, sulphur compounds and moisture.

* * * * *